(12) United States Patent
Klein et al.

(10) Patent No.: US 8,320,550 B2
(45) Date of Patent: Nov. 27, 2012

(54) METHOD AND SYSTEM FOR ASSIGNING TASKS TO WORKERS

(75) Inventors: Reuben Klein, East Brunswick, NJ (US); Daniel Sujansky, Neshanic Station, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 1265 days.

(21) Appl. No.: 11/827,812

(22) Filed: Jul. 13, 2007

(65) Prior Publication Data

US 2007/0258576 A1 Nov. 8, 2007

Related U.S. Application Data

(63) Continuation of application No. 10/638,619, filed on Aug. 11, 2003, now Pat. No. 7,263,183.

(51) Int. Cl.
*H04M 3/00* (2006.01)

(52) U.S. Cl. .............................. 379/265.09; 379/265.02
(58) Field of Classification Search .................. 709/202, 709/205; 379/265.09, 265.02
See application file for complete search history.

(56) References Cited

U.S. PATENT DOCUMENTS

| | | | |
|---|---|---|---|
| 5,778,060 A * | 7/1998 | Otto | 379/266.09 |
| 5,999,965 A * | 12/1999 | Kelly | 709/202 |
| 2002/0055967 A1* | 5/2002 | Coussement | 709/202 |
| 2002/0055975 A1* | 5/2002 | Petrovykh | 709/205 |
| 2004/0062380 A1* | 4/2004 | Delaney | 379/265.02 |
| 2006/0115074 A1* | 6/2006 | Hollatz et al. | 379/265.09 |

* cited by examiner

*Primary Examiner* — Rasha Al Aubaidi

(57) ABSTRACT

A method and system for assigning tasks can receive requested tasks, keep a requested-task queue, keep one or more worker statuses associated with respective workers, and assign the requested tasks from the requested-task queue to selected ones of the workers. In one embodiment, the requested tasks are telephone calls received by a network based contact center, and the workers are telephone agents associated with the network based contact center.

15 Claims, 10 Drawing Sheets

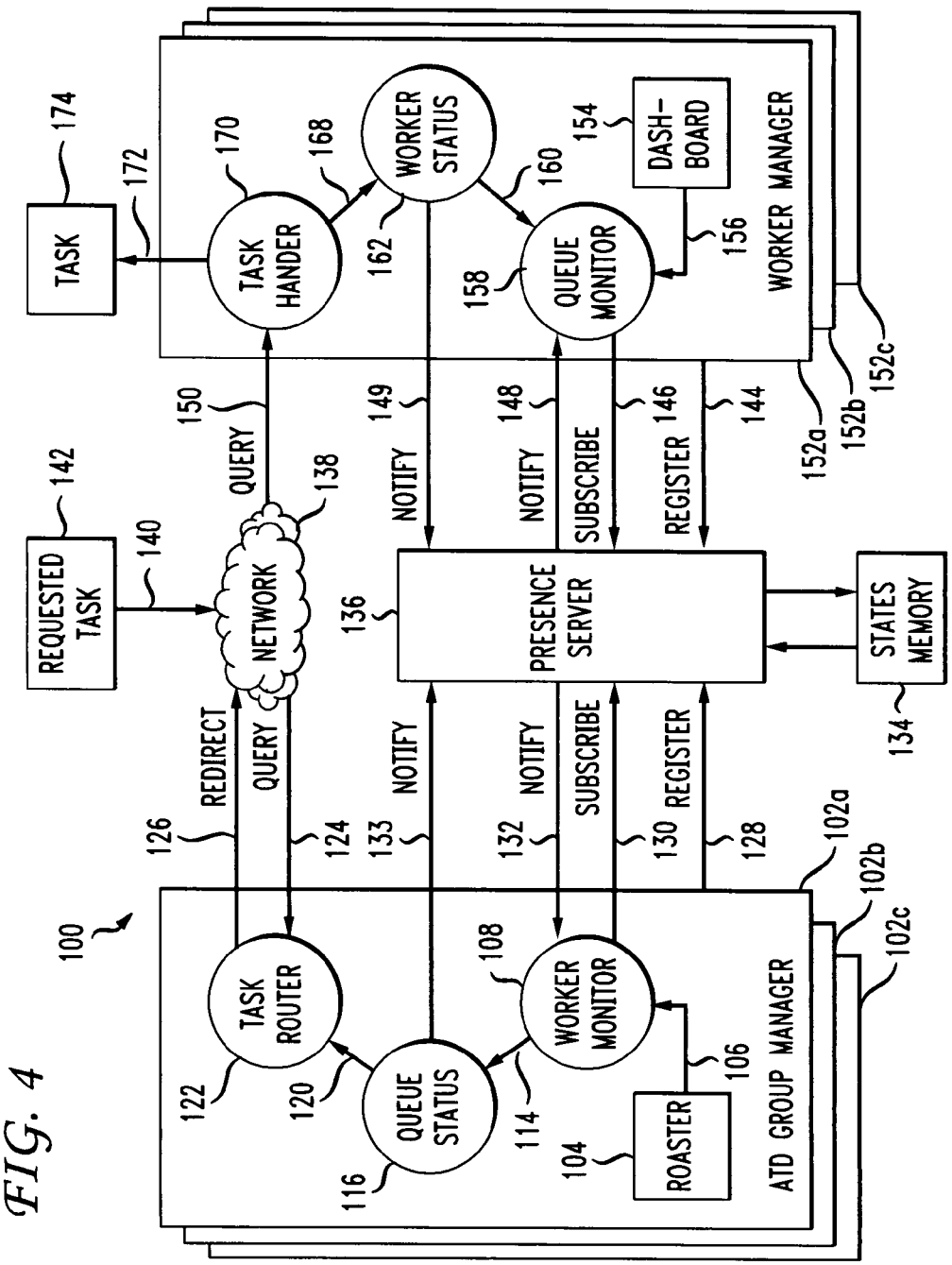

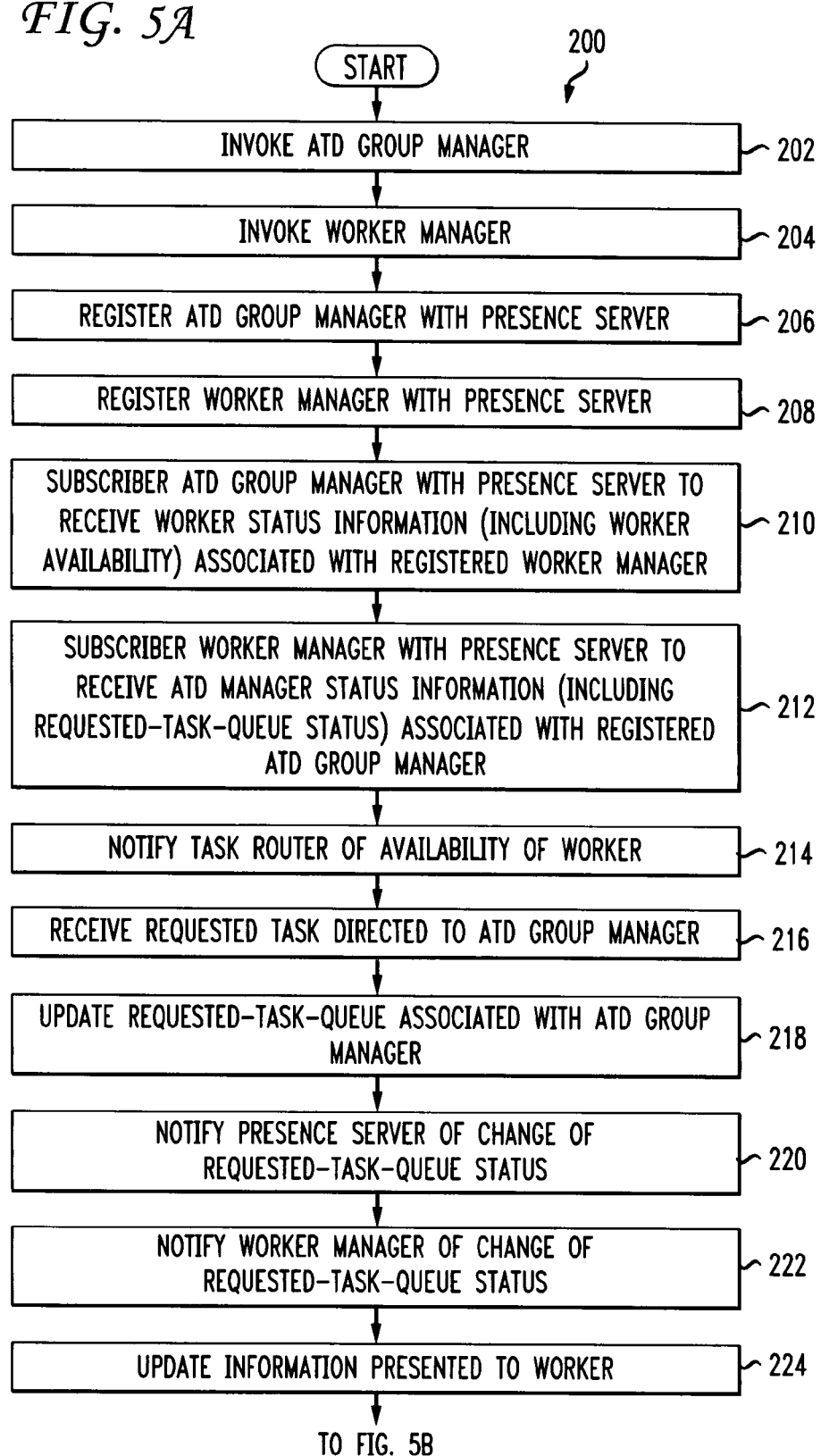

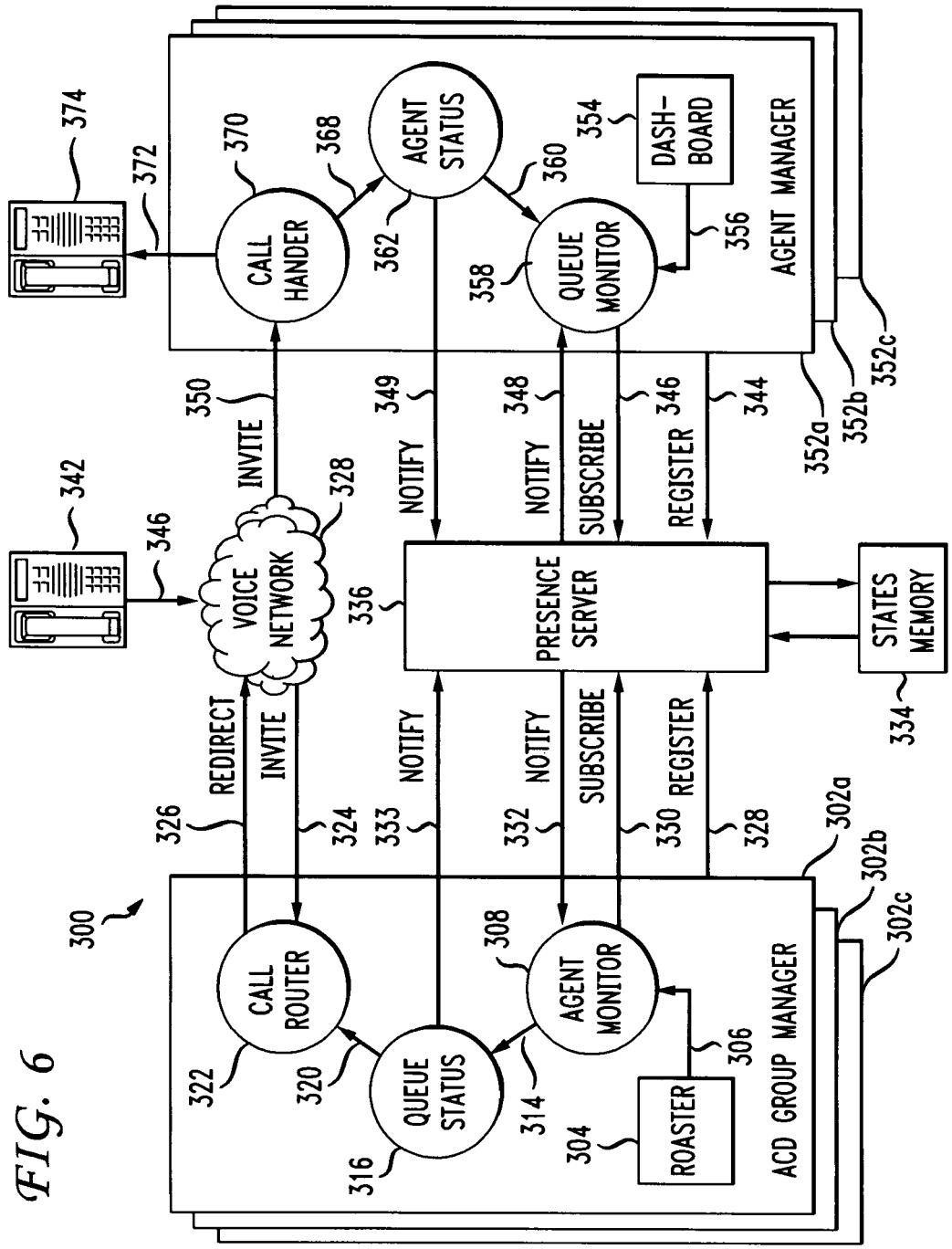

FIG. 8

You are qualified for these groups:

| Select | ACD Group | Queue | Agents | Time |
|---|---|---|---|---|
| ☐ | Hardware Support ~504a | 2 ~506a | 2 ~508a | 0:05 ~510a |
| ☑ | Software Support ~504b | 5 ~506b | 1 ~508b | 0:45 ~510b |
| ☐ | Billing Inquiry ~504c | 15 ~506c | 4 ~508c | 0:08 ~510c |
| ☐ | Order Processing ~504d | 8 ~506d | 10 ~508d | 0:01 ~510d |

502 / 504 / 506 / 508 / 510

Instructions: Check any groups you wish to join and calls will begin to be routed to your station.

Your status: [On a call] ~512  Call Type: [Software Support] ~514

Time on call: [5 minutes] ~516

METHOD AND SYSTEM FOR ASSIGNING TASKS TO WORKERS

CROSS REFERENCE TO RELATED APPLICATIONS

This application is a continuation of Ser. No. 10/638,619, filed Aug. 11, 2003, which issued as U.S. Pat. No. 7,263,183 on Aug. 28, 2007.

STATEMENT REGARDING FEDERALLY SPONSORED RESEARCH

Not Applicable.

FIELD OF THE INVENTION

This invention relates generally to computer systems and methods and, more particularly, to computer systems and methods for assigning tasks to selected ones of a plurality of workers.

BACKGROUND OF THE INVENTION

In an organization having workers, a task can often be assigned to any worker who is available to do the work. For example, in a law office having attorneys, legal work can be assigned to any attorney who is not already busy or low on work. Many organizations have managers who manually assign the tasks to the workers. Manual assignment can be a slow and tedious process that is not well suited to an organization receiving many tasks and having many workers.

Some organizations automate the assignment of tasks. For example an organization can include a contact center, also referred to as a communication center or a calling center, having workers (e.g., agents) to whom tasks (e.g., telephone calls) are automatically assigned.

A contact center will be recognized to be a system to which a person outside the contact center can communicate to receive and/or transmit information. The person can communicate with the contact center in a variety of ways, including but not limited to, telephone calls, Internet access, E-mail, and facsimile.

Known contact centers can have many workers, referred to as agents, to whom a caller can be connected to in a telephone call. When the caller requests a communication with an agent, the contact center automatically selects an agent from among many agents. The selection is based on a variety of factors, including telephone call queue (wait list) and agent availability. A contact center agent can be viewed as a worker among many workers, to whom a requested task is assigned in the form of a telephone call from the caller.

A typical prior art contact center can include one or more interactive voice response systems (IVR). The IVRs provide automatic branching voice prompts to which the caller responds with button pushes on a telephone keypad or with voice responses on a telephone. The contact center can be provided having only the IVR systems, or alternatively, it can also provided having agents. For example, at the end of the IVR branching voice queries, the caller can be directed to press zero to speak to an agent. The agent is a person having a telephone to talk to the caller, hereafter referred to as an "agent telephone," and a computer to access information about the caller, hereafter referred to as an "agent computer." Note that though the agent telephone and the agent computer are often associated with one person, they can correspond to distinct electronic systems and may be separately referred to herein.

Conventional contact centers can include a variety of complex and expensive customer premise equipment (CPE). For example, such contact centers can include one or more public exchange/automatic call distributor PBX/ACD systems, one or more IVR systems, one or more computer telephony integration (CTI) systems, one or more agent telephones, one or more agent computers, one or more database server computers, one or more database storage areas, one or more web server computers, and one or more E-mail server computers, each of which are further explained in conjunction with FIG. 1. Having such a contact center may require that an organization purchase and maintain the CPE.

A contact center can have a variety of groups, each of which has specific agents assigned to a group. For example, a contact center can have a hardware support group, a software support group, a billing inquiry group, and an ordering processing group. Each one of the groups can have, for example, fifty assigned agents available to answer telephone calls, each of whom are trained to answer questions pertaining to the group to which they are assigned.

The number of agents assigned to a group can change from time to time, for example as agents begin and finish their work hours. However, the number of agents working in association with a group is relatively static. The relatively static nature of the number of assigned agents can, at times, cause excessively long telephone call queues and associated wait times. For example, if the number of telephone calls to a group exceeds the capacity of the number of agents working in association with the group to answer telephone calls, a caller may have to wait a long time before they are connected to an agent. When the telephone call queues and associated wait times become excessively long, additional agents can be added to the group. However, the addition of agents is a manual process requiring intervention by a contact center manager.

Conventionally, the agent telephones are coupled to the contact center by way of the PBX/ACD. As is known in the art, the PBX/ACD requires the agents to be physically present at the contact center in order to receive the telephone calls. Therefore, addition of agents when the telephone call queues and associated wait times become excessively long is difficult to achieve, since the addition of agents requires not only intervention by the contact center manager as described above, but also requires the additional agents to travel to the contact center.

In another conventional arrangement, agents are distributed among more than one contact center. This is often done because of the limitations of building size, but also because of the need to cover longer working hours. In order to allow agents to work no more than 8 hours a day, companies often have contact centers on the east and west coasts. With this arrangement, calls can be routed by the public telephone network preferentially to an Eastern contact center from 8 AM to 11 AM EST, then equally between Eastern and Western contact centers from 11 AM to 5 PM, then preferentially to the Western contact center from 5 PM to 8 PM EST, and then equally again during the night hours of 8 PM to 8 AM. With this particular arrangement, the public network is unaware of the queue lengths at the various contact centers and cannot balance the load since some calls may be longer than others resulting in random peaks and valleys in agent availability.

In the conventional system described above, there is no mechanism to rebalance the load among different contact centers. Therefore, in the natural course of call processing, different contact centers may have different queue lengths.

It would, therefore, be desirable to overcome the aforesaid and other disadvantages.

SUMMARY OF THE INVENTION

The present invention provides a method and a system by which task assignments associated with an organization can be automatically provided to workers physically remote from the organization. When applied to the functions of a contact center, the present invention provides a method and a system by which telephone calls can be assigned to agents remote from the contact center. The agents can either be collocated or dispersed. The method and system of the present invention provide a reduction of or an elimination of customer premise equipment (CPE) conventionally associated with the contact center. While the invention is primarily shown and described in conjunction with a contact center, it should be understood that the invention applies to any organization receiving tasks that can be assigned to a variety of workers.

In one aspect of the invention, a method for assigning requested tasks associated with an organization includes providing at least one of an automatic task distributor (ATD) group manager and a worker manager, registering at least one of the ATD group manager and the worker manager with a presence server to provide information to the presence server, and subscribing at least one of the ATD group manager and the worker manager with the presence server to receive information from the presence server. In one embodiment, the ATD group manager and the worker manager communicate with the presence server using an instant messaging protocol. In one particular embodiment, the organization is a contact center, the ATD group manager is an automatic call distributor (ACD) group manager, the worker manager is an agent manager, and the requested tasks are requested telephone calls associated with the contact center.

In accordance with another aspect of the present invention, a method for assigning requested tasks associated with an organization includes a machine readable medium having computer readable code for enabling a processor to perform steps including providing an automatic task distributor (ATD) group manager, registering the ATD group manager with a presence server to provide information to the presence server, and subscribing the ATD group manager with the presence server to receive information from the presence server. In one embodiment, the ATD group manager communicates with the presence server using an instant message protocol. In one particular embodiment, the organization is a contact center, the ATD group manager is an automatic call distributor (ACD) group manager, and the requested tasks are requested telephone calls associated with the contact center.

In accordance with yet another aspect of the present invention, a method for assigning requested tasks associated with an organization includes a machine readable medium having computer readable code for enabling a processor to perform steps including providing a worker manager, registering the worker manager with a presence server to provide information to the presence server, and subscribing the worker manager with the presence server to receive information from the presence server. In one embodiment, the worker manager communicates with the presence server using an instant message protocol. In one particular embodiment, the organization is a contact center, the worker manager is an agent manager, and the requested tasks are requested telephone calls associated with the contact center.

In accordance with yet another aspect of the present invention, a system for assigning requested work includes at least one of an automatic task distributor (ATD) group manager component adapted to communicate with a presence server component in order to recognize when a worker is present and available and to route a requested task to the worker, a worker manager component adapted to communicate with the presence server component in order to recognize that the ATD group manager is present, and the presence server component.

BRIEF DESCRIPTION OF THE DRAWINGS

The foregoing features of the invention, as well as the invention itself may be more fully understood from the following detailed description of the drawings, in which:

FIG. 4 is a block diagram of an exemplary system for assignment of requested tasks in accordance with the present invention;

FIG. 6 is a block diagram of an exemplary system for assignment of telephone calls to contact center agents in accordance with the present invention;

FIG. 8 is a pictorial of an exemplary dashboard having a graphical user interface in accordance with the system of FIG. 6.

DETAILED DESCRIPTION OF THE INVENTION

Before describing the method and system for assigning tasks to workers, some introductory concepts and terminology are explained. In particular, a prior art "contact center" is described below in conjunction with FIG. 1. Also, a prior art "instant message" system is described below in conjunction with FIG. 2.

Figure 1:
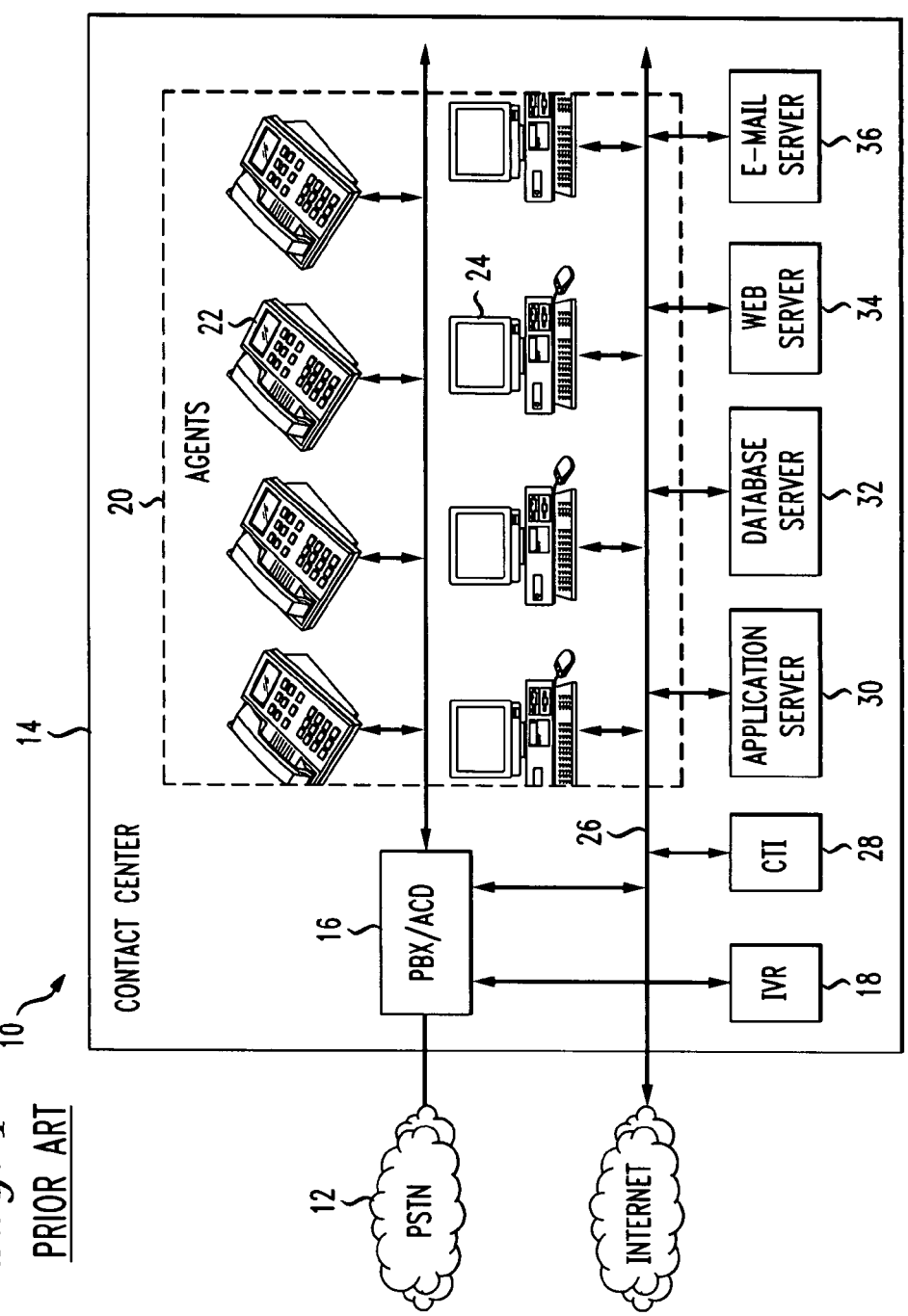
FIG. 1 is a block diagram of a prior art contact center.

Referring now to FIG. 1, a prior art contact center 10, also referred to as a calling center or a communication center, is connected to a public switched telephone network 12 (PSTN). The PSTN will be recognized to be a worldwide telephone system that provides telephone call connections including telephone call connections to a contact center 14. The contact center 14 can include a private branch exchange 16 (PBX) usually combined with an automatic call distributor 16 (ACD). The PBX 16 will be recognized to be a system that can route incoming telephone calls to intended call recipients, or agents. The ACD 16 will be recognized to be a system that can provide telephone call queuing and automatic wait handling of incoming telephone calls. The PBX/ACD 16 can be coupled to one or more interactive voice response systems 18 (IVR). The IVR 18 will be recognized to be a system that provides voice queries to a telephone caller. Voice queries typically direct the telephone caller through a series of selections that can be chosen by the telephone caller via button pushes on the telephone keypad. Voice queries typically direct the telephone call through a serious of questions and prompts to determine the nature and/or intent of the call, and may be chosen by the telephone caller via button pushes on the telephone keypad and/or via a speech recognition system.

Within the IVR queries, the telephone caller can be directed by the IVR 18 to select an option that connects the telephone caller, via the PBX/ACD 16, to one of a group of agents 20. The agents 20 can have access to agent telephones, of which agent telephone 22 is representative of all agent telephones. The agents 20 can also have access to agent computers, of which agent computer 24 is representative of all agent computers.

The PBX/ACD 16 is further coupled to a network 26, which couples together the PBX/ACD 16, the agent computers, for example agent computer 24, a computer telephony integration (CTI) server 28, an application server 30, a database server 32, a web server 34, and an E-mail server 36. The network 26 can, for example, correspond to an Ethernet local area network.

The IVR 18 can, among the IVR selections offered, request that the telephone caller enter "identifying information," for example an account number, by button pushes on the telephone keypad or by voice responses from the telephone caller. Identifying information can also be automatically provided by the PBX/ACD 16 without entry by the telephone caller with a variety of methods, including a dialed number identification service (DNIS) and an automatic number identification (ANI). The identifying information is passed through the PBX/ACD 16 to the network 26. The CTI 28 receives the identifying information and coordinates the identifying information with "caller data," for example account history associated with the telephone caller, contained in the database server 32. An application program in the application server 30, can automatically provide a display of the caller data in a "screen pop" to the agent disposed upon the agent computer 24. Alternatively, the application program can reside within the agent computer 24.

When a contact center has no CTI 28, or if the screen pop is delayed by system data flow bottlenecks, the agent can manually identify the telephone caller using the agent computer 24 by entering the identifying information via the keyboard of the agent computer 24.

The contact center 14 can also be accessed via the Internet 37, for example by a web user who accesses a web page associated with the contact center. The web user, via the Internet 37, connects to the web server 34 for web page access. The web user can also be an E-mail user, in which case the E-mail user connects to the E-mail server 36 via the Internet 37. While web page access and E-mail access have been described herein, the invention is not limited to only these specific Internet applications. A variety of Internet applications can access a variety of servers within the contact center 14.

Figure 2:
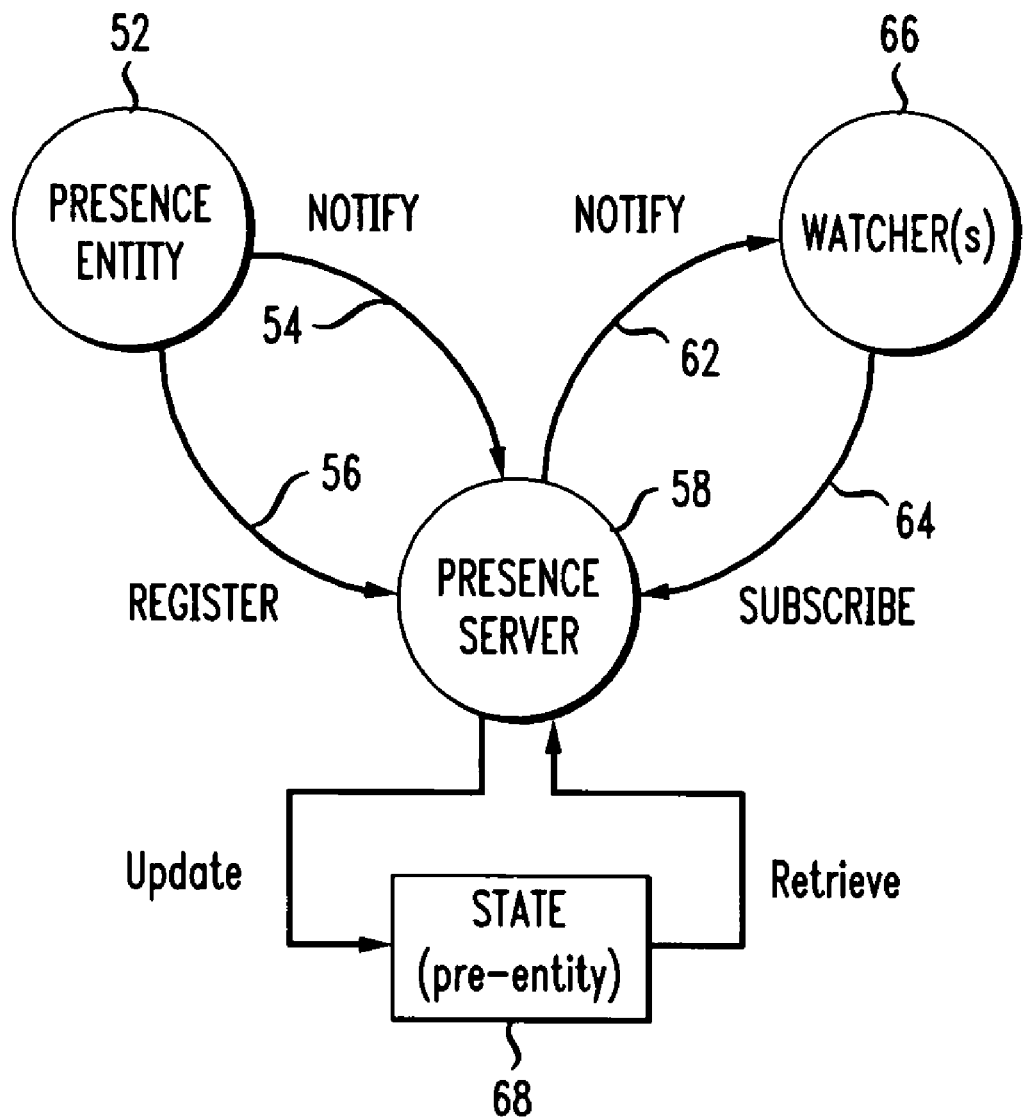
FIG. 2 is a block diagram showing an exemplary instant message system flow in accordance with the present invention.

Referring now to FIG. 2, a prior art instant message system 50 includes a presence entity 52, also referred to as a "presentity," coupled to a presence server 58, which is coupled to a watcher 66. Particular communications between the presence entity 52, the presence server 58, and the watcher 66 are indicated by connecting arrows.

The presence entity 52 registers with the presence server 58 by way of a "register" communication 56. The register communication 56 allows the presence server to recognize that the presence entity 52 is present and able to communicate with the presence server. The register communication 56 can also provide "status" information, also referred to as "state" information herein, to the presence server 58 about the presence entity 52. For example, the status information can include an identity of the presence entity 52 and can include an indication that the presence entity 52 is currently connected to the presence sever 58. For the prior art arrangement shown, the status information is limited to certain types of information, for example, an availability of the presence entity 52 to communicate in an instant message. The status information is saved by the presence server 58, providing some or all of a "state" 60 associated with the presence entity 52.

The watcher 66 subscribes with the presence server 58 by way of a "subscribe" communication 64. By so subscribing, the watcher 66 is able to receive the state 60 associated with the presence entity 52 from the presence server 58. Therefore, the watcher 66 is able to recognize that the presence entity 52 is currently connected to the presence server 58 and is also able to identify the presence entity 52. The watcher is further able to recognize any of the other state information 60 provided to the presence server 58 by the presence entity 52.

At any time, or at any change of status, the presence entity 52 can notify the presence server 58, by way of a "notify" communication 54, that a change has occurred in the status of the presence entity 52. For example, the presence entity can communicate to the presence server 58 that a status associated with the presence entity 52 has changed from available to busy. In response to the notification 54, the presence server 56 can notify the watcher 66, by way of a notify communication 62, that the change of the status has occurred in the presence entity 52.

While one watcher 66 has been described above, it should be understood that any number of watchers can subscribe with the presence server 58 in order to receive the state information 60 associated with the presence entity 52. The one watcher 66 can also subscribe with one or more other presence servers (not shown). Similarly, any number of watchers can be notified of changes of status in the presence entity 52.

While one presence entity 52 is shown, it should be understood that any number of presence entities can register with the presence server 58. When more than one presence entity is registered with the presence server 58, state information 60 associated with each of the more than one presence entities is saved by the presence server 58. The watcher 66 can subscribe to receive state information pertaining to selected ones of the more than one presence entity. In this way, the subscribing can be seen to be similar to a "buddy list," recognized to be part of a conventional instant message application.

Also, while the presence entity 52 is shown to be separate from the watcher 66, the presence entity 52 can simultaneously be a watcher which subscribes with the presence server 58 in order to receive state information pertaining to other presence entities. Similarly, the watcher 66 can also be a presence entity, which registers with the presence server 58 in order to give state information to the presence server, which is therefore available to watchers.

The above describes part of a conventional instant message arrangement, having communications typical of known instant message communication systems and formats. When the communications are provided having an instant message format, the presence server 58 can be an instant message server.

There are a wide variety of instant message formats. An Instant Messaging and Presence Protocol (IMPP) working group within the Internet Engineering Task Force (IETF), is establishing a presence standard around a Common Presence and Instant Messaging Protocol (CPIM). The IMPP members include Microsoft®, which promotes Microsoft Network (MSN®), and Lotus®, which promotes Sametime®. The IMPP has proposed a model for presence communication and instant messaging as a Request for Comments (RFC) 2778, and also has proposed a set of requirements as an RFC 2779.

Not all instant message providers promote the formats proposed by the IMPP working group described above. For example, America Online (AOL®) promotes AOL® Instant Messenger (AIM®), Yahoo® promotes Yahoo Messenger®, and ICQ®, Inc. promotes ICQ forms of instant message communications. An opensource community promotes another form of instant message communications called Jabber. A session initiation protocol (SIP) working group has also proposed an extension to SIP, referred to as SIP for Instant Messaging and Presence Leveraging Extensions (SIMPLE), wherein the extension would provide instant messaging communications. Also there is an extensible markup presence protocol (XMPP) that supports instant messaging.

All of the above formats follow the general pattern of registering, subscribing, and notifying described in conjunction with FIG. 2. One of ordinary skill in the art will also understand that is it possible to provide bridges between the formats in order to make the formats interoperable on one network.

Figure 3:
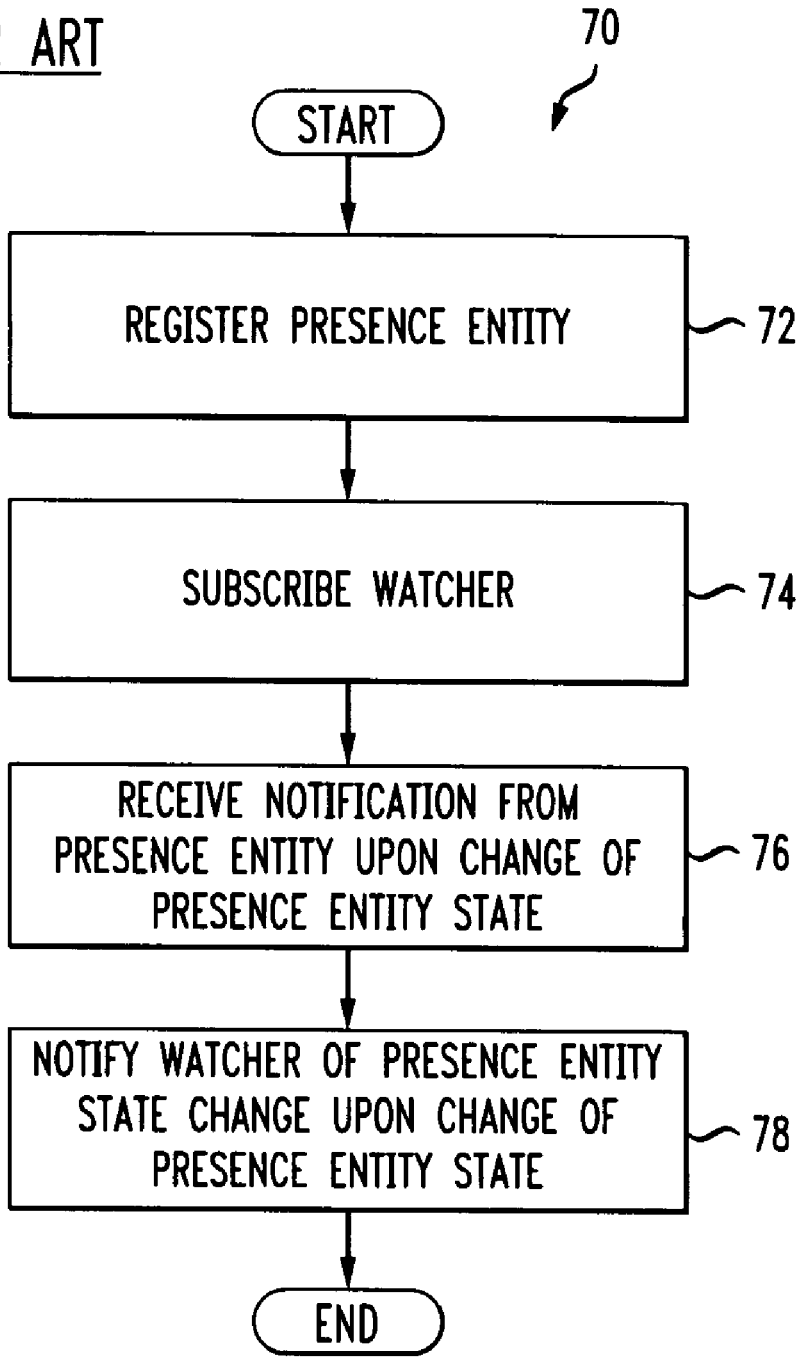
FIG. 3 is a flow chart showing a communication method used in association with the illustrative instant message flow of FIG. 1.

Referring now to FIG. 3, a prior art method 70 provides instant message communication in accordance with the system of FIG. 2. At step 72, a presence entity (e.g., 52, FIG. 2) registers with the presence server (e.g., 58, FIG. 2). As described above, the registering step provides all or part of state information (e.g., 60, FIG. 2) to the presence sever 58.

At step 74, a watcher (e.g., 66, FIG. 2) subscribes with the presence server, in order to receive the state information pertaining to the presence entity. As described above, the subscribing step 74 provides the watcher with the ability to receive state information associated with the presence entity from the presence server.

The presence server receives notification (e.g., 54, FIG. 2) at step 76 from the presence entity associated with a change in state of the presence entity. As described above, the change in state can be, for example, a change in availability of the presence entity. Then, at step 78, the presence server notifies the watcher of the change in state associated with the presence entity.

The method 70 describes an arrangement having a presence entity and having a watcher. As described above, the presence entity can also be a watcher and the watcher can also be a presence entity. Also, in other arrangements, there can be any number of presence entities and any number of watchers.

Referring now to FIG. 4, an exemplary task assignment system 100 in accordance with the present invention includes one or more automatic task distributor (ATD) group manager components 102a-102c. The ATD group manager component 102a is representative of all such ATD group manager components and has modules the same as or similar to modules provided in others of the ATD group manager components 102b, 102c. While three ATD group manager components 102a-102c are shown, in other embodiments, the system 100 can include fewer than three or more than three ATD group manager components.

The ATD group manager component 102a includes a roster module 104, having a list of workers. The roster module 104 provides the list of workers to a worker monitor module 108 upon request. The worker monitor module 108 contains information associated with states, also referred to as statuses, of the workers. The worker monitor module 108 provides the list of the workers and the states of the workers to a queue status module 116. The queue status module 116 contains a requested-task queue associated with requested tasks presented to the system 100. The queue status module 116 combines the list of workers, the states of the workers, and the requested-task queue and provides the combined information to a task router module 122.

The ATD group manager component 102a, the worker monitor module 108, and the queue status module 116 are each coupled to a presence server 136. The coupling is indicated by arrows associated with a "register" signal 128, a "subscribe" signal 130, a worker monitor "notify" signal 132 and a queue status "notify" signal 133. While the signals 128, 130, 132, 133 are shown to separately couple to the presence server 136, it should be understood that the signals can be provided as a single coupling having the register signal 128, the subscribe signal 130, the notify signal 132, and the notify signal 133. For example, the register signal 128, the subscribe signal 130, the notify signal 132, and the notify signal 133 can be coupled to the presence server 136 through a network, such as through the Internet (not shown).

The task router module 122 is coupled to a network 138 via a "query" signal 124 and a "redirect" signal 126. While the signals 124, 126 are shown to separately couple the task router 122 to the network 138, it should be understood that the signals 124, 126 can be provided as a single coupling having the query signal 124 and the redirect signal 126. The network can be a voice network, for example a public switched telephone network (PSTN). In another embodiment, the network 138 is a digital network, for example, the Internet. Further network types will be readily apparent to one of ordinary skill in the art.

The system 100 also includes one or more worker manager components 152a-152c. The worker manager component 152a is representative of all such worker manager components and is described herein to have modules the same as or similar to modules provided in others of the worker manager components 152b, 152c. While three worker manager components 152a-152c are shown, in other embodiments, the system 100 can include fewer than three or more than three worker manager components.

The worker manager component 152a includes a task handler module 170 coupled to a worker status module 162. The worker status module 162 is coupled to a queue monitor module 158, which is coupled to a dashboard 154, for presenting a graphical user interface (not shown) to a worker. The task handler module 170 directs a task 174 to the worker. The task handler module 170 is coupled to the network 138 for receiving query signal 150.

The worker manager component 152a, the queue monitor module 158, and the worker status module 162 are each coupled to the presence server 136. The coupling is indicated by arrows associated with a "register" signal 144, a "subscribe" signal 146, a "notify" signal 148, and a "notify" signal 149. While the signals 144, 146, 148, 149 are shown to separately couple to the presence server 136, it should be understood that the signals 144, 146, 148, 149 can be provided as a single coupling having the register signal 144, the subscribe signal 146, the notify signal 148, and the notify signal 149 therein. For example, the register signal 144, the subscribe signal 146, the notify signal 148, and the notify signal 149 can be coupled to the presence server 136 through a network, such as through the Internet (not shown).

In operation, the ATD group manager component 102a operates as both a presence entity and as a watcher. Similarly, the worker manager component 152a operates as both a presence entity and a watcher. Presence entity and watcher functions are described above in conjunction with FIGS. 2 and 3. Operating as presence entities, both the ATD group manager component 102a and the worker manager component 152a register with the presence server 136 by way of the register signal 128 and the register signal 144 respectively. In so registering, the presence server 136 is able to recognize that the ATD group manager component 102a and the worker manager component 152a are both present and that both are able to communicate with the presence server 136. Also in so registering, states associated with the ATD group manager component 102a and with the worker manager component 152a are provided to the presence server and stored in a states memory 134. A state associated with the worker manager component 152a can include a variety of information, including, but not limited to, an identity of the worker manager 152a, an availability of the worker manager component 152a (and a worker associated therewith) to perform a task, a capability of the worker associated with the worker manager component 152a to perform a task, and contact information associated with the worker manager component 152a, for example, a telephone number. Similarly, a state associated with the ATD group manager component 102a can include a variety of information, including, but not limited to, an identity of the ATD group manager component 102a, and a requested-task-queue status associated with a number of requested tasks to be performed. The requested tasks to be performed are herein referred to as the requested-task queue, and the number of requested tasks in the requested-task queue is herein referred to as the requested-task-queue status.

Once registered, the ATD group manager component 102a and the worker manager component 152a, and in particular, the worker monitor module 108 and the queue monitor module 158, subscribe to the presence server. Subscribing allows the ATD group manager component 102a and the worker manager component 152a to become watchers, allowing each to receive state, i.e. status, information about the other from the presence server component 136. In particular, the queue monitor module 158 can receive status information associated with the queue status module 116 via the presence server component 136 and the worker monitor module 108 can receive status information associated with the worker status module 162, also via the presence server component 136.

When a requested task 142 is communicated to the network 138, the requested task 142 is communicated as the query signal 124 over the network 138 to the task router module 122. As described above, the task router module 122 receives the status information from the worker monitor module 108 associated with the status of the worker manager component 152a, and in particular receives status information associated with an availability of the worker manager component 152a (and a worker associated therewith) to perform a task. The task router 122 receives from the queue status module 116 the requested-task queue including a waiting list of requested tasks not yet assigned to a worker manager component.

When the requested task 142 is received as the query signal 124 as described above, the task router module 122 communicates the incoming requested task to the queue status module 116. The queue status module 116 adjusts the status of the appropriate task queue and communicates a notify signal 133 to the presence server component 136, indicating a change in status, i.e., a change in the requested-task-queue status, associated with the ATD group manager component 102a, and the new requested-task-queue status is saved in the states memory 134. The presence server component 136 communicates the new requested-task-queue status to the worker manager component 152a as a notify signal 148.

If the queue status module 116 indicates that workers are available to act upon the request, the task router 122 is able to redirect the query signal 124 to a worker manager component 152a associated with a worker available to perform the requested task 142. The query signal 124 is acknowledged as a redirect signal 126 coupled to the network 138. The redirect signal 126 emerges from the network 138 as a query signal 150 coupled to the task handler module 170 within the worker manager component 152a. The task handler module 170 directs the query 150 as a task 174 to a worker.

The task handler module 170 also communicates with the worker status module 162, indicating that the worker manager component 152a (and the worker associated therewith) is not presently available to perform another task. The worker status module 162 communicates a notify signal 149 to the presence server 136, indicating a change a status, e.g., a change in availability associated with the worker manager component 152a. The new status is saved in the states memory 134. The presence server component 136 communicates the new status to the ATD group manager component 108 as the notify signal 132.

With the above described arrangement, the ATD group manager component 102a and the worker manager component 152a are each aware of the presence of the other and each is notified about status of the other.

In one particular arrangement, the register signals 128, 144, the subscribe signals 130, 146, and the notify signals 132, 133, 148, 149 are provided as instant message signals. The format of the instant message signals can be one or more of a variety of types of instant message signals, including but not limited to Common Presence and Instant Messaging Protocol (CPIM) signals, America OnLine® Instant Messenger (AIM®) signals, Yahoo® Instant Messenger (YIM®) signals, ICQ instant message signals, Jabber instant message signals, extensible markup presence protocol (XMPP) signals, and session initiation protocol (SIP) instant message signals.

The requested task 142 can be any type of requested task that can be performed by a worker associated with the worker manager component 152a. For example, the requested task 142 can include legal work and the worker can be an attorney. For another example, the requested task 142 can be a telephone call directed to a contact center and the worker can be a contact center agent. The system 100 is applicable to any organization at which requested tasks are received, and wherein the organization has one or more workers capable of performing the requested tasks.

While the system 100 is described above to have a variety of components and modules, the system 100 can also depict a software arrangement having the ATD group manager component 102a and the worker manager component 152a, each having instructions for registering, subscribing, and notifying, for example, with an instant message format, to the presence server 136.

In one embodiment, the worker manager component 152a corresponds to a personal computer, workstation, or the like, having software modules therein, including the task handler module 170, the worker status module 162, and the queue status module 158. Similarly, in one embodiment, the ATD group manager component 102a corresponds to a server computer, having software modules therein, including the task router module 122, the queue status module 116, the worker monitor module 108 and the roster module 104. In one embodiment, the presence server 136 is a single server, for example an instant message server. However, it will be recognized, that in other embodiments, selected ones of the task router module 122, the queue status module 116, the worker monitor module 108 and the roster module 104 can be within the presence server component 136. Also, selected ones of the task handler modules 170, the worker status module 162, and the queue monitor module 158 can be within the presence server component 136. Other arrangements are also possible without departing from the present invention.

As described above, the dashboard 154 presents a graphical user interface (not shown) to a worker. The dashboard 154 can present a variety of information to the worker, including but not limited to, an identity of one or more ATD group managers, for example, the identity of the ATD group manager component 102a, and a requested-task-queue status, for example a value associated with a size of the requested-task queue or the length of time in queue of the oldest task contained in the queue monitor module 158. The dashboard 154 is described in greater detail in conjunction with FIG. 8 below.

Figure 5B:
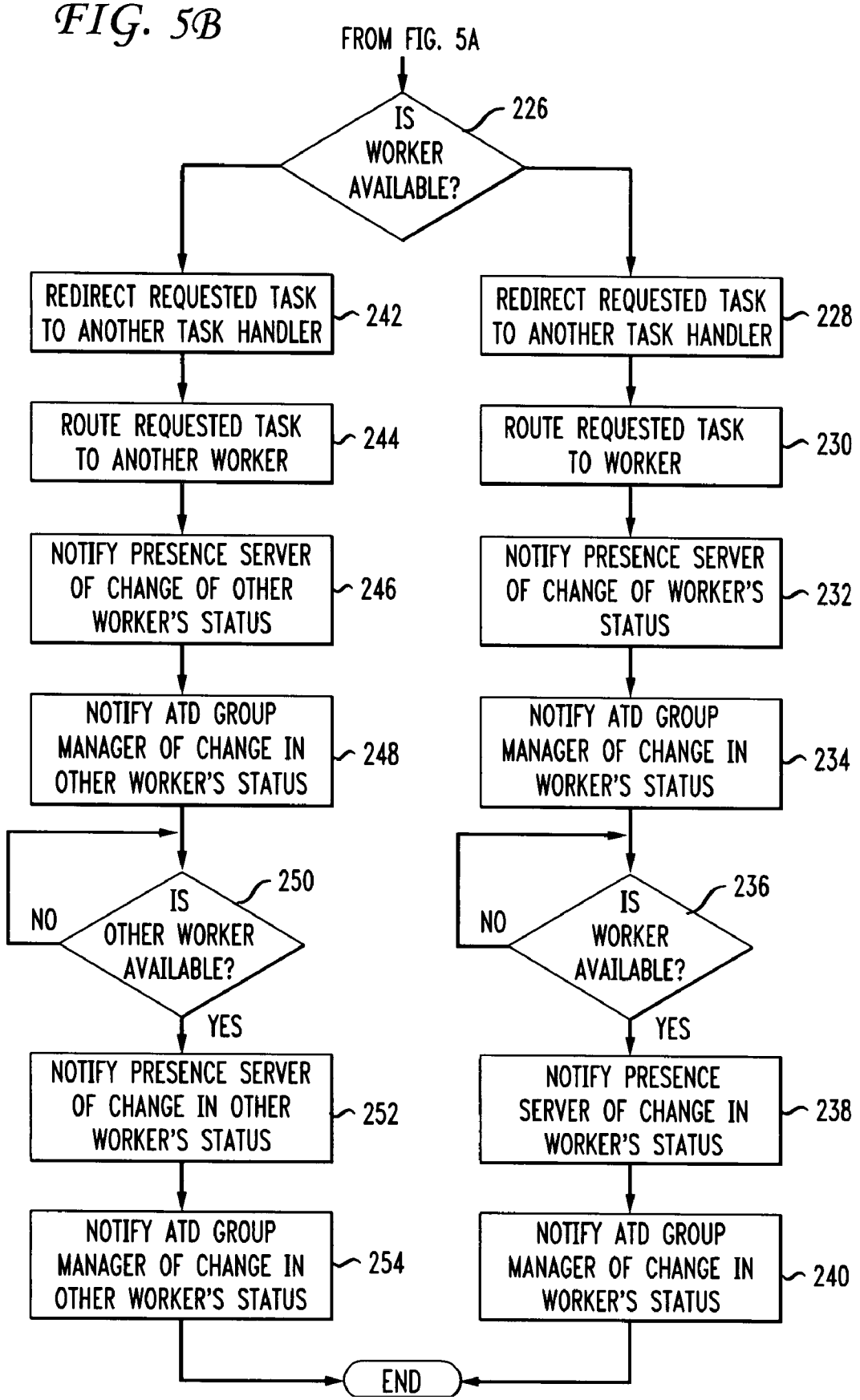
FIG. 5 is a flow chart showing an exemplary method associated with the exemplary system of FIG. 4.

FIG. 5 shows an exemplary method 200 associated with the system 100 of FIG. 4. At step 202, at least one ATD group manager component is invoked. The ATD group manager component can be the same as or similar to the ATD group manager component 102a of FIG. 4. As described above in conjunction with FIG. 4, the ATD group manager component 102a can have a variety of associated modules.

At step 204, at least one worker manager component is invoked. The worker manager component can be the same as or similar to the worker manager component 152a of FIG. 4. As described above in conjunction with FIG. 4, the worker manager component can have a variety of associated modules.

The ATD group manager registers with a presence server at step 206, thereby becoming a presence entity. The presence server can be the same as or similar to the presence server component 136 of FIG. 1. As described above, registering the ATD group manager allows the presence server to recognize that the ATD group manager is present and also communicates the requested-task-queue status to the presence server.

The worker manager registers with the presence server, thereby becoming a presence entity at step 208. As described above, registering the worker manager allows the presence server to recognize that worker manager is present and also communicates worker status information to the presence server. The worker status information includes, but is not limited to, an availability of the worker to perform a task, and a capability of the worker to perform the requested task.

At step 210, the ATD group manager subscribes with the presence server, thereby becoming a watcher. The ATD group manager subscribes in order to receive the worker status information from the presence server.

The worker manager subscribes with the presence server at step 212, thereby becoming a watcher. The worker manager subscribes in order to receive the requested-task-queue status from the presence server.

A task router associated with the ATD group manager is notified of the worker status, and in particular is notified of the availability of the worker at step 214. The task router can be the same as or similar to the task router module 122 shown in FIG. 4.

At step 216, the ATD group manager receives a requested task. The task can be any sort of task. For example, the task can be work which a worker associated with the worker manager is capable of performing.

The ATD group manager updates the requested-task queue associated with the ATD group manager at step 218 to add the new requested task. At step 220, the presence server is notified of the change in the requested-task-queue status by the ATD group manager. The worker manager is notified at step 222 of the change in the requested-task-queue status by the presence server.

At step 224, information presented to the worker on a graphical user interface is updated. The graphical user interface (GUI) can be the same as or similar to the dashboard 154 shown in FIG. 4. The information presented to the worker on the graphical user display can include, but is not limited to, an identity of the ATD group manager, respective identities of other ATD group managers, the requested-task-queue status associated with the ATD group manager, and other requested-task-queue statuses associate with the other ATD group managers.

A decision is made by the ATD group manger at step 226, based upon the worker status presented to the ATD group manager at step 214. If the worker status, which includes the worker availability, indicates that the worker associated with the worker manager is available to perform the requested task, then the process continues to step 228. However, the worker status can include a variety of other information, including but not limited to a capability of the worker to perform the requested task. In another embodiment, the process can continue to step 228 only if the worker is both available to perform the requested task and the worker is also capable of performing the requested task.

At step 228, the requested task, received at step 216 by the ATD group manager, is re-directed to a task handler associated with the worker manager. The task handler can be the same as or similar to the task handler module 170 shown in FIG. 4.

The requested task is routed at step 230 from the task handler as a task to the worker. The task can be the same as or similar to the task 174 shown in FIG. 4. At step 232, the presence server is notified of a change in the worker status associated with the worker. In essence, the worker has now become unavailable.

The ATD group manager is notified by the presence server at step 234 of the change in the worker status. Therefore, the ATD group manger becomes aware that the worker is not presently available to receive another requested task should one be presented to the ATD group manager. If another requested task is received before the requested task is completed by the worker associated with the worker manager, the other requested task can be re-directed to another worker associated with another worker manager.

The process loops at step 236 until the worker associated with the worker manager finishes the requested task and again becomes available. At step 238, the worker manager notifies the presence server when the worker associated with the worker manager completes the requested task and again becomes available. The presence server notifies the ATD group manager at step 240 that the worker associated with the worker manager is available to receive another requested task.

If, at step 226, the worker is not available, the requested task is routed to another task handler at step 242, associated with another worker manager and another worker. The steps 244-254 are comparable to the steps 230-240 but apply to another worker rather than the worker discussed above. Therefore, steps 244-254 are not described in detail.

Referring now to FIG. 6, an exemplary system 300 in accordance with the present invention shows a particular example of the system of FIG. 4 applied to a contact center. In FIG. 6, elements similar to those of FIG. 4 should be readily apparent. The exemplary system 300 includes one or more automatic call distributor (ACD) group manager components 352a-352c. The ACD group manager component 302a is representative of all such ACD group manager components and has modules the same as or similar to modules provided in others of the ACD group manager components 302b, 302c. While three ACD group manager components 302a-302c are shown, in other embodiments, the system 300 can include fewer than three or more than three ACD group manager components.

The ACD group manager component 302a includes a roster module 304, having a list of agents therein. The roster module 304 provides the list of agents to an agent monitor module 308 upon request. The agent monitor module 308 contains information associated with states of the agents. The agent monitor module 308 provides the list of the agents and the states of the agents to a queue status module 316. The queue status module 316 contains a requested-telephone-call queue associated with requested telephone calls presented to the system 300. The queue status module 316 combines the list of agents, the status of the agents, and the requested-telephone-call queue and provides the combined information to a call router module 322.

The ACD group manager component 302a, the agent monitor module 308, and the queue status module 316 are each coupled to a presence server 336. The coupling is indicated by arrows associated with a "register" signal 328, a "subscribe" signal 330, a worker monitor "notify" signal 332 and a queue status "notify" signal 333. While the signals 328, 330, 332, 333 are shown to separately couple to the presence server 336, it should be understood that the signals 328, 330, 332, 333 can be provided as a single coupling having the register signal 328, the subscribe signal 330, the notify signal 332, and the notify signal 333. For example, the register signal 328, the subscribe signal 330, the notify signal 332, and the notify signal 333 can be coupled to the presence server 336 through a network, such as through the Internet (not shown).

The call router module 322 is coupled to a network 338 via an "invite" signal 324 and a "redirect" signal 326. While the signals 324, 326 are shown to separately couple the call router 322 to the network 338, it should be understood that the signals 324, 326 can be provided as a single coupling having the invite signal 324 and the redirect signal 326. The network can be a voice network, for example a public switched telephone network (PSTN). In another embodiment, the network 338 is a digital network, for example, the Internet. Further network types will be readily apparent to one of ordinary skill in the art.

The system 300 also includes one or more agent manager components 152a-152c. The agent manager component 352a is representative of all such agent manager components and is described herein to have modules the same as or similar to modules provided in others of the agent manager components 352b, 352c. While three agent manager components 352a-352c are shown, in other embodiments, the system 300 can include fewer than three or more than three agent manager components.

The agent manager component 352a includes a call handler module 370 coupled to an agent status module 362. The agent status module 362 is coupled to a queue monitor module 358, which is coupled to a dashboard 354 for presenting a graphical user interface (not shown) to an agent. The call handler module 370 directs a telephone call 374 to the agent. The call handler module 370 is coupled to the network 338 for receiving invite signals 350.

The agent manager component 352a, the queue monitor module 358, and the agent status module 362 are each coupled to the presence server 336. The coupling is indicated by arrows associated with a "register" signal 344, a "subscribe" signal 346, a "notify" signal 348, and a "notify" signal 349. While the signals 344, 346, 348, 349 are shown to separately couple to the presence server 336, it should be understood that the signals 344, 346, 348, 349 can be provided as a single coupling having the register signal 344, the subscribe signal 346, the notify signal 348, and the notify signal 349 therein. For example, the register signal 344, the subscribe signal 346, the notify signal 348, and the notify signal 349 can be coupled to the presence server 336 through a network, such as through the Internet (not shown).

In operation, the ACD group manager component 302a operates as both a presence entity and as a watcher. Similarly, the agent manager component 352a operates as both a presence entity and a watcher. Operating as presence entities, both the ACD group manager component 302a and the agent manager component 352a register with the presence server 336 by way of the register signal 328 and the register signal 344 respectively. In so registering, the presence server 336 is able to recognize that the ACD group manager component 302a and the agent manager component 352a are both present and that both are able to communicate with the presence server 336. Also in so registering, states, also referred to herein as statuses, associated with the ACD group manager component 302a and with the agent manager component 352a, are provided to the presence server and stored in a states memory 334. A state associated with the agent manager component 352a can include a variety of information, including, but not limited to, an identity of the agent manager 352a, an availability of the agent manager component 352a (and an agent associated therewith) to perform a telephone call, a capability of the agent associated with the agent manager component 352a to perform a telephone call, and contact information associated with the agent manager component 352a, for example, a telephone number. Similarly, a state associated with the ACD group manager component 302a can include a variety of information, including, but not limited to, an identity of the ACD group manager component 302a, and a requested-telephone-call-queue status associated with a number of requested telephone calls to be handled. The requested telephone calls to be performed are herein referred to as the requested-telephone-call queue described above, and the number of requested telephone calls in the requested-telephone-call queue is herein referred to as the requested-telephone-call-queue status.

Once registered, the ACD group manager component 302a and the agent manager component 352a, and in particular, the agent monitor module 308 and the queue monitor module 358, subscribe to the presence server. Subscribing allows the ACD group manager component 302a and the agent manager component 352a to become watchers, allowing each to receive state, i.e. status, information about the other from the presence server component 336. In particular, the queue monitor module 358 can receive state information associated with the queue status module 316 via the presence server component 336 and the agent monitor module 308 can receive state information associated with the agent status module 362, also via the presence server component 336.

When a requested telephone call 342 is communicated to the network 338, the requested telephone call 342 is communicated as the invite signal 324 over the network 338 to the call router module 322. As described above, the call router module 322 receives the state information from the agent monitor module 308 associated with the state of the agent manager component 352a, and in particular receives state information associated with an availability of the agent manager component 352a (and an agent associated therewith) to perform a telephone call. The call router module 322 receives from the queue status module 316 the requested-telephone-call queue including a waiting list of requested telephone calls not yet assigned to an agent manager component.

When the requested telephone call 342 is received as the invite signal 324 as described above, the call router module 322 communicates the incoming requested telephone call to the queue status module 316. The queue status module 316 adjusts the status of the appropriate telephone call queue and communicates a notify signal 333 to the presence server component 336, indicating a change in status, i.e., a change in the requested-telephone-call-queue status, associated with the ATD group manager component 302a, and the new requested-telephone-call-queue status is saved in the states memory 334. The presence server component 336 communicates the new requested-telephone-call-queue status to the agent manager component 352a as a notify signal 348.

If the queue status module 316 indicates that agents are available to act upon the request, the call router 322 is able to redirect the invite signal 324 to an agent manager component 352a associated with an agent available to perform the requested telephone call 342. The invite signal 324 is acknowledged with a redirect signal 326 coupled to the network 338. The redirect signal 326 emerges from the network 338 as an invite signal 350 coupled to the call handler module 370 within the agent manager component 352a. The call handler module 370 directs the invite 350 as a telephone call 374 to an agent.

The call handler module 370 also communicates with the agent status module 362, indicating that the agent manager component 352a (and the agent associated therewith) is no longer available to perform another telephone call. The agent status module 362 communicates a notify signal 349 to the presence server 336, indicating a change in state, e.g., a change in availability associated with the agent manager component 352a. The new state is saved in the states memory 334. The presence server component 336 communicates the new state to the ACD group manager component 308 as the notify signal 332.

With the above described arrangement, the ACD group manager component 302a and the agent manager component 352a are each aware of the presence of the other and each is notified about the status of the other.

In one particular arrangement, the register signals 328, 344, the subscribe signals 330, 346, and the notify signals 332, 333, 348, 349 are provided as instant message signals. The format of the instant message signals can be one or more of a variety of types of instant message signals, including but not limited to Common Presence and Instant Messaging Protocol (CPIM) signals, America OnLine® Instant Messenger (AIM®) signals, Yahoo® Instant Messenger (YIM®) signals, ICQ instant message signals, Jabber instant message signals, extensible markup presence protocol (XMPP) signals, and session initiation protocol (SIP) instant message signals.

While the system 300 is described above to have a variety of components and modules, the system 300 can also depict a software arrangement having the ACD group manager component 302a and the agent manager component 352a, each having instructions for registering, subscribing, and notifying, for example, with an instant message format, to the presence server 336.

In one embodiment, the agent manager component 352a corresponds to a personal computer, workstation, or the like, having software modules therein, including the call handler module 370, the agent status module 362, and the queue status module 358. Similarly, in one embodiment, the ACD group manager component 302a corresponds to a server computer, having software modules therein, including the call router module 322, the queue status module 316, the agent monitor module 308, and the roster module 304. In one embodiment, the presence server 336 is a single server, for example an instant message server. However, it will be recognized, that in other embodiments, selected ones of the call router module 322, the queue status module 316, the agent monitor module 308 and the roster module 304 can be within the presence server component 336. Also, selected ones of the call handler modules 370, the agent status module 362, and the queue monitor module 358 can be within the presence server component 336. Other arrangements are also possible without departing from the present invention.

As described above, the dashboard 354 presents a graphical user interface (not shown) to an agent. The dashboard 354 can present a variety of information to the agent, including but not limited to, an identity of one or more ACD group managers, for example, the identity of the ACD group manager component 302a, and a requested-telephone-call-queue status, for example a value associated with a size of a requested-telephone-call queue contained in the queue monitor module 358. The dashboard 354 is described in greater detail in conjunction with FIG. 8 below.

With the system 300, it should be appreciated that, unlike a conventional contact center, agents associated with the contact center can be distributed away form the contact center. Furthermore, it will be appreciated that the "screen pop" having telephone caller information described in conjunction with FIG. 1 can be provided to the worker manager 352a by a variety of means, for example via the Internet. Therefore, the agent can receive both telephone calls and screen pops in the same way as an agent associated with a conventional contact center.

Figure 7A:
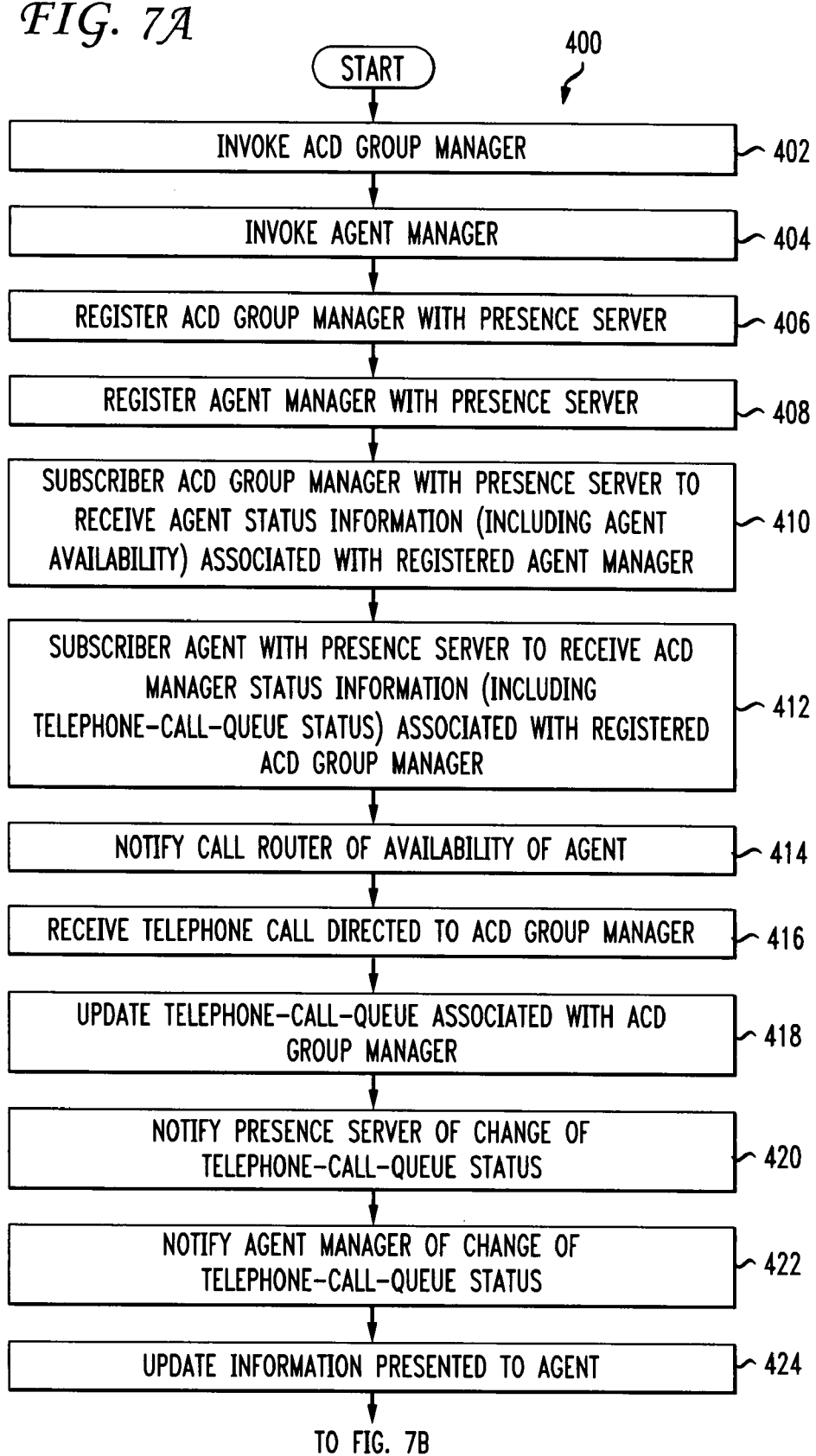
FIG. 7 is a flow chart showing an exemplary method associated with the exemplary system of FIG. 6.
Figure 7B:
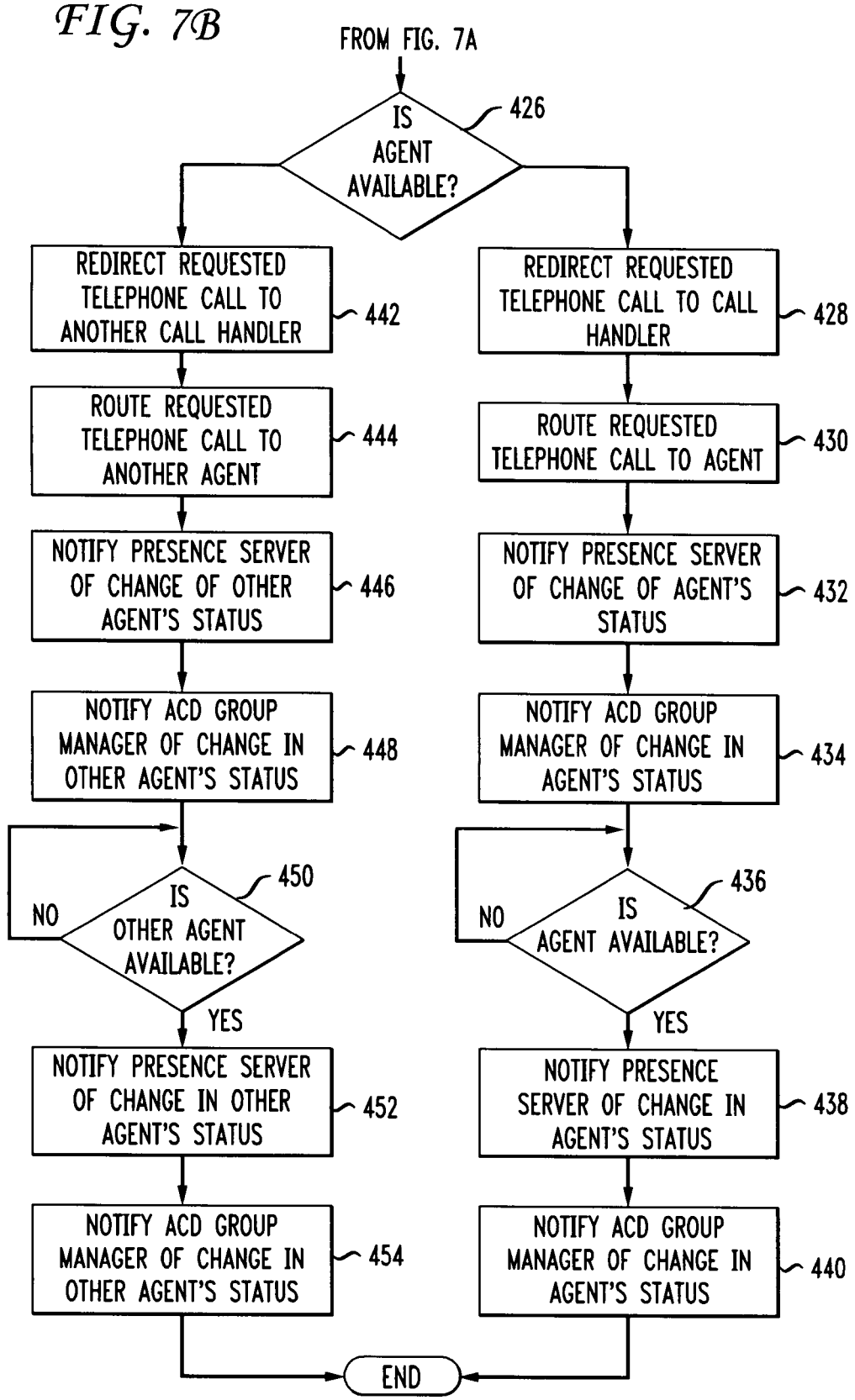

Referring now to FIG. 7, an exemplary method 400 associated with the system 300 of FIG. 6 begins at step 402, where at least one ACD group manager component is invoked. The ACD group manager component can be the same as or similar to the ACD group manager component 302a of FIG. 6. As described above in conjunction with FIG. 6, the ACD group manager component 302a can have a variety of associated modules.

At step 404, at least one agent manager component is invoked. The agent manager component can be the same as or similar to the agent manager component 352a of FIG. 6. As described above in conjunction with FIG. 6, the agent manager component can have a variety of associated modules.

The ACD group manager registers with a presence server at step 406, thereby becoming a presence entity. The presence server can be the same as or similar to the presence server component 336 of FIG. 6. As described above, registering the ACD group manager allows the presence server to recognize that the ACD group manager is present and also communicates the requested-telephone-call-queue status to the presence server.

The agent manager registers with the presence server, thereby becoming a presence entity at step 408. As described above, registering the agent manager allows the presence server to recognize that agent manager is present and also communicates agent status information to the presence server. The agent status information includes, but is not limited to, an availability of the agent to perform a telephone call, and a capability of the agent to perform the requested telephone call.

At step 410, the ACD group manager subscribes with the presence server, thereby becoming a watcher. The ACD group manager subscribes in order to receive the agent status information from the presence server.

The agent manager subscribes with the presence server 336 at step 412, thereby becoming a watcher. The agent manager subscribes in order to receive the requested-telephone-call-queue status from the presence server.

A call router associated with the ACD group manager is notified of the agent status, and in particular is notified of the availability of the agent at step 414. The call router can be the same as or similar to the call router module 322 shown in FIG. 6.

At step 416, the ACD group manager receives a requested telephone call. The telephone call can be any sort of telephone call. For example, the telephone call can be work which an agent associated with the agent manager is capable of performing.

The ACD group manager updates the requested-telephone-call queue associated with the ACD group manager at step 418 to add the new requested telephone call. At step 420, the presence server is notified of the change in the requested-telephone-call-queue status by the ACD group manager. The agent manager is notified at step 422 of the change in the requested-telephone-call-queue status by the presence server.

At step 424, information presented to the agent on a graphical user interface is updated. The graphical user interface (GUI) can be the same as or similar to the dashboard 354 shown in FIG. 6. The information presented to the agent on the graphical user display can include, but is not limited to, an identity of the ACD group manager, respective identities of other ACD group managers, the requested-telephone-call-queue status associated with the ACD group manager, and other requested-telephone-call-queue statuses associate with the other ACD group managers.

A decision is made by the ACD group manger at step 426, based upon the agent status presented to the ACD group manager at step 412. If the agent status, which includes the agent availability, indicates that the agent associated with the agent manager is available to perform the requested telephone call, then the process continues to step 428. However, the agent status can include a variety of other information, including but not limited to a capability of the agent to perform the requested telephone call. In another embodiment, the process can continue to step 428 only if the agent is both available to perform the requested telephone call and the agent is also capable of performing the requested telephone call.

At step 428, the requested telephone call, received at step 416 by the ACD group manager, is re-directed to a call handler associated with the agent manager. The call handler can be the same as or similar to the call handler module 370 shown in FIG. 6.

The requested telephone call is routed at step 430 from the call handler as a telephone call to the agent. The telephone call can be the same as or similar to the telephone call 374 shown in FIG. 6. At step 432, the presence server is notified of a change in the agent status associated with the agent. In essence, the agent has now become unavailable.

The ACD group manager is notified by the presence server at step 434 of the change in the agent status. Therefore, the ACD group manger becomes aware that the agent is not presently available to receive another requested telephone call should one be presented to the ACD group manager. If another requested telephone call is received before the requested telephone call is completed by the agent associated with the agent manager, the other requested telephone call can be re-directed to another agent associated with another agent manager.

The process loops at step 436 until the agent associated with the agent manager finishes the requested telephone call and again becomes available. At step 438, the agent manager notifies the presence server when the agent associated with the agent manager completes the requested telephone call and again becomes available. The presence server notifies the ACD group manager at step 440 that the agent associated with the agent manager is available to receive another requested telephone call.

If, at step 426, the agent is not available, the requested telephone call is routed to another call handler at step 442, associated with another agent manager and another agent. The steps 444-454 are comparable to the steps 430-440 but apply to another agent rather than the agent discussed above. Therefore, steps 444-454 are not described in detail.

Referring now to FIG. 8, an exemplary dashboard 500 can be the same as or similar to the dashboard 354 shown in FIG. 6. The exemplary dashboard 500 includes five columns 502, 504, 506, 508, 510. Selected ones of the check boxes 502a-502e are selected (checked) by an agent, enabling the agent to receive telephone calls in subject areas represented by categories 504a-504d. The categories 504a-504d correspond to identities of ACD group manager components. For example, the category 504a can correspond to the identity of a particular ACD group manager represented by the ACD group manager 302a of FIG. 6. The other categories 504b-504d can correspond to other ACD group managers.

The categories 504a-504d can correspond to categories for which the agent is deemed to be capable of properly responding to associated requested telephone calls. As shown, the agent associated with the dashboard 500 is deemed to be capable of properly responding to telephone calls associated with "Hardware Support," "Software Support," "Billing Inquiry," and "Order Processing." While these categories can be associated with a single organization, they can equally well be associated with more than one organization, wherein the name of the organization can also be displayed.

Requested-telephone-call-queue statuses 506a-506d indicate a respective length associated with a requested-telephone-call queue associated with each category 506a-506d. For example, the requested-telephone-call-queue status 506a indicates that there are two telephone calls waiting in the category 504a, Hardware Support. A number-of-agents value 508a-508b can be displayed to indicate the total number of agents present (but not necessarily available) to receive a requested telephone call associated with a respective category. For example, the number-of-agents value 508a indicates that there are two agents present to receive requested telephone calls in the category 504a, Hardware Support. Time values 510a-510d indicate an age of the oldest requested telephone call in a requested-telephone-call queue in a respective category, i.e., a telephone call hold time. For example, the time value 510a indicates that oldest telephone call in the requested-telephone-call queue associated with the Hardware Support category is only five seconds old.

A worker status value 512 can indicate a variety of agent statuses, including, but not limited to "on a call," "available," and "not available." A time value 516 indicates a length of time associated with a telephone call that the agent is currently handling. A call type value 514 indicates a category associated with the telephone call that the agent is currently handling.

Having described preferred embodiments of the invention it will now become apparent to those of ordinary skill in the art that other embodiments incorporating these concepts may be used. Additionally, the software included as part of the invention may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that the invention should not be limited to the described embodiments but rather should be limited only by the spirit and scope of the appended claims. All publications and references cited herein are expressly incorporated herein by reference in their entirety.

What is claimed is:

1. A method of assigning a requested task associated with an organization to an available worker, comprising:
   providing a task manager for receiving the requested task, for storing a requested-task queue status associated with the requested task, for storing a worker status, and for routing the requested task to an available worker;
   providing a worker manager associated with the worker for storing the worker status and for receiving the requested task;
   providing a presence server associated as an intermediary with the task manager and worker manager, the task manager and the worker manager each being registered with the presence server to supply status information to the presence server and each subscribing to the presence server for receiving status information sent to the presence server from the other of the managers;
   receiving the requested task with the task manager;
   updating the requested-task queue status in accordance with the requested task;
   sending the updated requested-task-queue status from the task manager to the presence server;
   sending the requested-task-queue status from the presence server to the worker manager;
   sending the worker status from the worker manager to the presence server;
   sending the worker status to the task manager from the presence server;
   the task manager determining from the worker status provided to the task manager an availability of a worker to perform the requested task;
   the task manager selecting an available worker to be assigned the received task;
   directing the received requested task from the task manager to the worker manager associated with the selected available worker;
   directing the requested task from the worker manager to the available worker;
   changing the status of the available worker receiving the requested task;
   sending the change in worker status associated with the available worker from the worker manager to the presence server;
   sending the change in worker status from the presence server to the task manager; and
   updating the stored worker status in the task manager in accordance with the change in worker status.

2. The method of claim 1, wherein the organization comprises a contact center, the task manager comprises an automatic call distributor (ACD) group manager, the worker is a contact center agent, the requested task comprises a requested telephone call, the requested-task queue comprises a telephone call queue, the requested-task-queue status comprises a number of telephone calls in the telephone-call queue, the worker status comprises a contact center agent status, the task manager further comprises a telephone call router, the worker manager comprises a contact center agent manager, and the worker manager further comprises a telephone call handler directing the requested task to the available worker.

3. The method of claim 1, further comprising a second task manager and a second worker manager each associated with the presence server and sending status information to the presence server and receiving status information from the presence server and wherein at least one of the task managers and worker managers communicates with the presence server through an instant message protocol.

4. The method of claim 3, wherein the instant message protocol comprises at least one of a common presence and instant message protocol (CPIM), a jabber protocol, an extensible markup presence protocol (XMPP), a session initiation protocol (SIP), an ICQ protocol, and a SIMPLE protocol.

5. The method of claim 1, further including generating a graphical user interface (GUI) in the worker manager indicating at least one of the requested-task-queue status and an identity of the task manager.

6. The method of claim 1, further including:
   determining from the worker status a capability of the worker to perform the requested task;
   the task manager selecting a worker in accordance with the availability of the worker and with the capability of the worker; and
   directing the requested task to the worker manager associated with the selected worker.

7. The method of claim 1, wherein at least one of the receiving the requested task and the directing the requested task to the worker manager are provided over a first network.

8. The method of claim 7, wherein the first network comprises a selected one of a public switched telephone network (PSTN) and a digital network.

9. The method of claim 1, wherein at least one of the updating the requested-task queue, the sending to the presence server the requested-task-queue status, the sending to the worker manager the requested-task-queue status, the sending to the presence server the change in worker status, and the notifying sending to the task manager the change in worker status are provided over a second network.

10. The method of claim 9, wherein the second network comprises a digital network.

11. A computer system for assigning a requested task associated with an organization to an available worker, comprising:
   a task manager component to receive the requested task, to recognize when a worker is available, to select an available worker and to route the requested task to the available worker, the task manager component having:
      a worker monitor for recognizing a worker status associated with the worker,
      a requested-task queue monitor for providing a requested-task queue having a requested-task-queue status, and
      a task router coupled to the requested-task queue monitor to route the requested task to an available worker,
   a worker manager component associated with a worker for providing a worker status and for receiving the requested task, the worker manager component having a task handler for providing the received requested task to the worker; and
   a presence server component associated as an intermediary with the task manager and worker manager, the task manager and the worker manager each being registered with the presence server to supply status information to the presence server and each subscribing to the presence server for receiving status information sent to the presence server from the other of the managers, the presence server receiving the requested-task-queue status from the task manager component and receiving the worker status from the worker manager component and sending the worker status to the worker monitor of the task manager component and sending the requested-task-queue status to the worker manager component.

12. The computer system of claim 11, wherein the organization comprises a contact center, the task manager component comprises an automatic call distributor (ACD) group manager, the worker status comprises a contact center agent status, the worker comprises a contact center agent, the requested-task queue monitor comprises a telephone-call queue, the requested task is a telephone call, the requested-task queue comprises a requested-telephone-call queue, the requested-task-queue status comprises telephone calls in the requested-telephone-call queue, and the task router comprises a telephone call router.

13. The computer system of claim 11, further comprising a second task manager component and a second worker manager component each associated with the presence server and sending status information to the presence server and receiving status information from the presence server that was sent to the presence server by another manager and wherein the presence server component communicates with at least one of the task manager components and the worker manager components with an instant message protocol.

14. The computer system of claim 13, wherein the instant message protocol comprises at least one of an AOL® Instant Message (AIM®), a Yahoo® Instant Messenger (YIM®) protocol, a common presence and instant message protocol (CPIM), a jabber protocol, an extensible markup presence protocol (XMPP), a session initiation protocol (SIP), and an ICQ protocol.

15. The computer system of claim 11 wherein the worker manager component has:
   a queue monitor for recognizing a requested-task queue having a requested task; and
   a worker status monitor coupled to the queue monitor for providing the worker status associated with the worker to the presence server component.

* * * * *